(12) United States Patent
Flessner et al.

(10) Patent No.: US 12,437,384 B2
(45) Date of Patent: Oct. 7, 2025

(54) COMPUTER-IMPLEMENTED METHOD FOR OPTIMISING A DETERMINING OF MEASUREMENT DATA OF AN OBJECT

(71) Applicant: Volume Graphics GmbH, Heidelberg (DE)

(72) Inventors: Matthias Flessner, Heidelberg (DE); Patrick Fuchs, Heidelberg (DE)

(73) Assignee: VOLUME GRAPHICS GMBH, Heidelberg (DE)

( * ) Notice: Subject to any disclaimer, the term of this patent is extended or adjusted under 35 U.S.C. 154(b) by 456 days.

(21) Appl. No.: 17/924,333

(22) PCT Filed: May 10, 2021

(86) PCT No.: PCT/EP2021/062287
§ 371 (c)(1),
(2) Date: Nov. 9, 2022

(87) PCT Pub. No.: WO2021/228748
PCT Pub. Date: Nov. 18, 2021

(65) Prior Publication Data
US 2023/0186453 A1    Jun. 15, 2023

(30) Foreign Application Priority Data
May 11, 2020  (DE) .................... 10 2020 112 652.2

(51) Int. Cl.
*G06T 7/00* (2017.01)
*G01N 23/046* (2018.01)
(Continued)

(52) U.S. Cl.
CPC ......... *G06T 7/0004* (2013.01); *G01N 23/046* (2013.01); *G01N 23/083* (2013.01);
(Continued)

(58) Field of Classification Search
None
See application file for complete search history.

(56) References Cited

U.S. PATENT DOCUMENTS

| | | | |
|---|---|---|---|
| 2006/0198499 A1 | 9/2006 | Spies et al. | |
| 2014/0368500 A1 | 12/2014 | O'Hare et al. | |
| 2017/0184737 A1* | 6/2017 | Dujmic | G01V 5/22 |

FOREIGN PATENT DOCUMENTS

| | | | |
|---|---|---|---|
| DE | 102017100594 A1 * | 7/2017 | |
| DE | 102017208811 A1 | 11/2018 | |
| WO | 2021228748 A1 | 11/2021 | |

OTHER PUBLICATIONS

Machine translation of Antrag (Year: 2017).*
(Continued)

*Primary Examiner* — Matthew G Marini
(74) *Attorney, Agent, or Firm* — SoCal IP Law Group LLP; Angelo Gaz (57) ABSTRACT

Described is a computer-implemented method for optimising a determining of measurement data of an object, where the measurement data is evaluated for geometrical characteristics of the object. The measurement data is determined by measuring the object using at least one recording parameter that includes at least one measurement geometry and/or at least one adjusting option for the measurement. The method includes the following steps: determining at least one measuring task for the object, wherein the measuring task is carried out by an evaluation method and it establishes the geometrical characteristics of the object; optimising the at least one recording parameter for the at least one measuring task for optimising the determining of measurement data; determining the measurement data for the object by measuring using the at least one optimised recording parameter; and carrying out the at least one measuring task for the object based on the determined measurement data.

13 Claims, 1 Drawing Sheet

(51) Int. Cl.
*G01N 23/083* (2018.01)
*G01N 23/18* (2018.01)
*G06T 7/13* (2017.01)
*G06T 7/60* (2017.01)

(52) U.S. Cl.
CPC .............. *G01N 23/18* (2013.01); *G06T 7/13* (2017.01); *G06T 7/60* (2013.01); *G06T 2207/20076* (2013.01); *G06T 2207/20081* (2013.01); *G06T 2207/30164* (2013.01)

(56) References Cited

OTHER PUBLICATIONS

German Patent Office, Examination Report for German Patent Application No. 10 2020 112 652.2, mail date Jan. 23, 2021.
European Patent Office, International Search Report and Written Opinion for PCT Application No. PCT/EP2021/062287, mail date Sep. 2, 2021.

* cited by examiner

COMPUTER-IMPLEMENTED METHOD FOR OPTIMISING A DETERMINING OF MEASUREMENT DATA OF AN OBJECT

RELATED APPLICATION INFORMATION

This patent claims priority from International PCT Patent Application No. PCT/EP2021/062287, filed May 10, 2021, entitled, "COMPUTER-IMPLEMENTED METHOD FOR OPTIMISING A DETERMINING OF MEASUREMENT DATA OF AN OBJECT", which claims priority to German Patent Application No. 10 2020 112 652.2, filed May 11, 2020, all of which are incorporated herein by reference in their entirety.

The invention relates to a computer-implemented method for optimizing a determining of measurement data of an object.

In the production of objects, for example components or workpieces, the objects are produced according to a nominal geometry. However, manufacturing tolerances and inaccuracies in the production have the result that the objects can deviate from the nominal geometry and can have defects in their interior. The objects are therefore checked either by random sampling or generally. Checking of the produced objects can be carried out by means of a measurement of the objects, for example to detect whether the dimensions of the measured object are within the manufacturing tolerances.

The measurement can be carried out in a contactless manner, in that image-processing methods are used. Furthermore, the interior of the object can be examined, for example using radiographic measurements. In such measurements, generally quite generic or nonspecific recording parameters are used in the recording of the measurement data and evaluation algorithms in the evaluation of the measurement data, although measuring tasks, e.g., geometry and material of the measured object and the measuring tasks to be carried out, including the relevant tolerances, differ strongly from one another. Instead, the generic or nonspecific recording parameters are used for a large bandwidth of different measuring tasks. The guideline here is that these recording parameters achieve the best possible results for all measuring tasks to be carried out.

The object of the invention is to provide a computer-implemented method which achieves better results for the measuring tasks to be carried out.

The main features of the invention are specified herein.

The invention relates in one aspect to a computer-implemented method for optimizing a determining of measurement data of an object, wherein the measurement data are evaluated for geometric properties of the object to be analyzed, wherein the measurement data are determined by means of a measurement of the object using at least one recording parameter, wherein the at least one recording parameter comprises at least one measurement geometry and/or at least one setting option for the measurement, wherein the method includes the following steps: determining at least one measuring task for the object, wherein the measuring task is carried out by means of an evaluation method and defines the geometric properties of the object to be analyzed; optimizing the at least one recording parameter for the at least one measuring task to optimize the determination of measurement data; determining the measurement data for the object by means of a measurement using the at least one optimized recording parameter; and carrying out the at least one measuring task for the object on the basis of the determined measurement data.

The recording parameters are optimized specifically for the task by the invention, before a measurement of the object is carried out. This in turn causes an optimization of the evaluation method for carrying out the measuring task. For each measuring task, first a separate recording parameter is therefore determined, which is optimized specifically for this measuring task. A trajectory comprised by the recording parameters, which a measuring device uses to measure the object, can be designed, for example, so that it is optimally designed for this measuring task. This can mean, for example, that the geometries of the object relevant for the measuring task are only recorded at an accuracy which is just sufficient for an informative and nonetheless rapid evaluation. Instead of determining measurement data at maximum resolution, for example, a lower resolution can be used, possibly locally, if the underlying evaluation method supplies approximately equally good results at the lower resolution as at the high resolution. In this case, since a higher resolution is generally more time intensive, a time saving can be achieved for the determination of the measurement data. Furthermore, the setting options comprised by the recording parameters, using which the properties of the device for measuring the object can be changed, can be optimized to the measuring task. Thus, for example, the device for measuring the object can be set so that the geometries which are relevant for the measuring task are depicted at an accuracy just sufficient for the measuring task. This causes a further time optimization of the determination of measurement data of the object, without significant losses in the informative power of the results of the evaluation method. Therefore, first an optimization of the recording parameters takes place to adapt the determined measurement data as optimally as possible to the measuring task. It is to be taken into consideration here that the optimization of the recording parameters does not necessarily mean that the determined measurement data have the best quality. Rather, the optimization of the recording parameters is intended to select the recording parameters so that the measurement data which are recorded based on the recording parameters just have a minimum quality to obtain informative results by means of the evaluation method underlying the optimization of the recording parameters. This can mean, for example, that recording parameters are sought, using which the measuring task can be carried out with the required accuracy in the shortest time and/or with the lowest number of measurement geometries. However, it is not excluded here that recording parameters can also be sought, using which the measuring task can be carried out at the highest accuracy in a defined time and/or with a defined number of measurement geometries. If radiographic measurements are carried out, for example using x-ray radiation, the optimized recording parameters can alternatively or additionally effectuate a minimization of the radiation dose used. However, combinations of these goals are also possible. After the optimization of the recording parameters, a measurement of the object is carried out by means of a device for measuring the object. The measurement data determined in this way are then used by an evaluation method to evaluate the geometric properties of the object. The computer-implemented method effectuates improved results for the measuring tasks to be carried out. The invention effectuates further advantages if a large number of objects having identical nominal geometry, which have to be checked with respect to the same features, the so-called measuring task, are analyzed very frequently. This is the case, for example, with an in-line check accompanying manufacturing, in which a great time saving is effectuated by the invention with improved results for the measuring tasks to be carried out. The same measuring task having the same tolerance specifications can thus be carried out in a shorter time. This saves valuable machine time or increases the machine capacity.

An optimization can furthermore mean, for example, that a knowledge-based system or an artificial intelligence proposes specific recording parameters on the basis of the measuring tasks. Simulations which use the recording parameters can also be carried out here in order to assess the optimization. In this case, for example, a first evaluation method can evaluate the measurement data and can compare the results of the evaluation to reference values, which can be, for example, a ground truth which was derived from the simulated geometry. From this evaluation, for example, a typical measurement error for the determination of the measurement data can be derived, which can be used for the assessment of the recording parameters. The evaluation method which is used for this purpose can already operate using optimized recording parameters or can itself have been optimized by means of the optimized recording parameters so that measurement data having lower quality, for example, if a small number of measurement geometries was used, achieve the best or most stable possible results. Further other methods can be used, for example, which do not use simulations and execute the optimization on the basis of a preliminary evaluation method.

The measuring task can comprise or require one or more analyses. Examples of the analyses can be: a defect analysis in 3D or 2D; an inclusion analysis in 3D or 2D; a surface or boundary surface determination, which is used, for example, for an analysis from the field of dimensional metrology, wherein a boundary surface can also be a surface which delimits a transition from material to air and a boundary surface between two materials of the measured object is analyzed, for example in multi-material objects; an analysis of geometrical properties such as dimensions, shape, location, waviness, or roughness; an analysis of fibers or fiber structures, both geometric properties of fibers, which can be individually segmented, and also analyses of fibers, the diameter of which is below the resolution limit of the measurement system, but which can still be analyzed as a composite, for example, with respect to their orientation; an analysis of properties of powders, e.g., diameter, volume, surface area of grains; an identification of error patterns of any type, for example, unmelted powder in additive manufacturing or cracks, and/or an analysis of any material properties, for example density.

Furthermore, multiple recording parameters can be optimized simultaneously with respect to multiple analyses.

The measuring task can also be defined for multi-material objects, which is advantageous in particular for the boundary surface determination, since this is made more difficult according to the prior art. The measuring task can be defined on defined sections of the object, so that the analyses only have to be carried out there. In this case, it can also be reasonable for the optimization to restrict oneself to these areas or to prefer them.

In axial computer tomography, projections are recorded in equidistant angle steps, wherein the same setting options are selected for all projections. In this example, the following, possibly global recording parameters can therefore be optimized, for example: number of the projections, orientation of the component with respect to the recording geometry or beam path, geometric magnification, setting options such as tube voltage, tube current, exposure time. This has the advantage that only a small number of recording parameters has to be optimized.

In the example of robot computer tomography, in which the measurement geometries can be selected freely as radiographic geometries, these recording parameters can be individually optimized, more or less for each projection. In addition, the radiographic geometries of the individual projections and the number of the projections are optimized. This enables more possibilities for the optimization, but also increases the required effort due to the larger number of the recording parameters.

The measurement can comprise, for example, an optical measurement, for example a strip projection or photogrammetry, or a radiographic measurement, e.g., computer tomography, radiography, or ultrasonic measurement, or a tactile sensor, for example with the aid of a feeler.

In the case of the optical measurements, for example, the measurement geometry can describe the observation direction of an optical sensor with respect to the measured object. In the case of a radiographic measurement, the measurement geometry can be a radiographic geometry, which describes the spatial relationship between the radiation source, the object, and the radiation detector. In this case the measurement geometry describes the direction in which radiation is transmitted through the object, but also the position of the area subject to radiography and the magnification. This may be described with the aid of nine geometrical degrees of freedom: for the translation, three degrees of freedom in each case for the radiation source and the radiation detector and for the rotation, three degrees of freedom for the radiation detector. A radiographic geometry can be defined with respect to the measured object and/or with respect to the device for measuring the object. In the case of a tactile measurement, the measurement geometry can describe, for example, the contact direction or the alignment of the object to be measured in the measurement volume.

The measurement of an object can mean the recording of individual or multiple radiographic images or projections of the object in the case of a radiographic measurement. In the case of an optical measurement, a measurement of an object can mean the recording of individual or multiple images of the object using a measurement camera or an optical sensor. In the case of a tactile sensor, a measurement of an object can mean the acquisition of individual or multiple measurement points on the object.

Setting options in the case of computer tomography, for example, can be voltage and current of an x-ray tube or the exposure time, which can also differ with respect to the individual radiographic images. In the case of photogrammetry, a setting option can be an exposure time of a camera. In the case of strip projection, a setting option can additionally be, for example, a pattern projected onto the object to be measured. In the case of a tactile sensor, a setting option can be, for example, a contact force.

To carry out a measurement using optimized measurement geometries or recording parameters, the object can be placed, for example, in a corresponding holder, which ensures a defined pose of the object. Alternatively or additionally, the pose of the object can be determined from the initially determined measurement data and the desired radiographic geometries can be approached accordingly by the device for measuring the object. It is thus ensured that the measurement data of the object are recorded using the desired measurement geometries.

According to one example, the step: optimizing the at least one recording parameter for the at least one measuring task can furthermore include the following substep: providing a set of predefined measurement geometries; selecting a subset of the set of predefined measurement geometries based on the measuring task.

Using the set of predefined measurement geometries, in particular in the case of a radiographic measurement, measurement geometries can be selected which have recording parameters presumably matching for the observed object and with respect to the evaluation method underlying the optimization of the recording parameters. The optimization of the recording parameters can thus be accelerated, since the recording parameters initially used for the optimization are already favorable. Furthermore, these can be measurement geometries for which the measuring device is already calibrated, so that an increased accuracy of the measurement results is enabled using these measurement geometries.

In this case, for example, measurement geometries can be omitted which are not relevant for the evaluation method. Alternatively or additionally, for example, the smallest number or subset of the existing measurement geometries can be sought out, in the case of which the measuring task can still be fulfilled.

According to another example, after the step of determining the measurement data for the object, the method can furthermore include the following step: determining a digital three-dimensional object representation from the measurement data; wherein the step of carrying out the at least one measuring task includes the following substep: analyzing the digital object representation on the basis of the measuring task.

In the case of a radiographic measurement in the form of a computer tomography, this can be a reconstruction of the volume data from projection data or radiographic images. In conjunction with the substeps of providing a set of predefined measurement geometries and selecting a subset of the set of predefined measurement geometries based on the measuring task, the optimized measurement geometries can be equidistant or non-equidistant in dependence on the measuring task. An equidistant measuring geometry can be advantageous, for example, for an axial computer tomography, since then the more widespread filtered rear projection can still be used for a reconstruction of the digital three-dimensional object representation, so-called volume data. Non-equidistant measurement geometries can be used if, for example, an iterative algorithm reconstructs the volume data. The setting options of the individual measurement geometries are typically left constant or not varied here.

In an optical measurement, the three-dimensional object representation can be a representation of the surface or a boundary surface of the object, which is calculated on the basis of the images recorded by the measuring camera.

Furthermore, the step of optimizing the at least one recording parameter can be carried out by means of at least one simulated radiographic measurement of the object.

In this example, a radiography of a geometry is simulated using defined recording parameters. Virtual radiographic images are usually the result, which can be evaluated using the methods used in the real radiographic measurements, for example, a reconstruction and/or evaluation method. Such a radiographic simulation can be based, for example, on ray tracing, on Monte Carlo methods, or on an image-based forward projection.

The measuring task can comprise, for example, at least one defect analysis for determining and analyzing possible defects in the object, where the measurement is carried out as a radiographic measurement.

Furthermore, respective minimum requirements can be defined for the analyses or for the analysis results for each of the analyses, which still have to be achieved using the optimized recording parameters. For example, a minimum accuracy can be defined, at which a geometric parameter has to be determinable. A further example can be a minimum reliability at which a critical property in the object has to be determinable.

Furthermore, the step of optimizing the at least one recording parameter for the at least one measuring task can furthermore include, for example, at least one of the following substeps, wherein the measurement is a radiographic measurement: changing the at least one recording parameter until every defect in the object which has a predefined minimum size is detected at a probability which is within a predefined probability interval for defects; changing the at least one recording parameter until geometric parameters of the defects in the object at a probability which is within a predefined probability interval for geometric parameters, are determined at a predefined minimum accuracy for defects.

Since it has not yet been possible for a probability that all defects are detected to reach 100%, in this example probability intervals can be specified, in which the probability that every defect in the object was detected has to be. The probability interval can be defined so that, for example, a defect of the defined size has to be discovered 95% of the time, i.e., for example, in 19 of 20 measurements. This is then considered to be reliable.

The minimum size can be defined locally, possibly varying. To assess whether with given, possibly optimized recording parameters defects of the corresponding minimum size can be reliably identified, for example, real and/or simulated test measurements can be carried out. The probability can be determined therefrom with the aid of Monte Carlo methods that defects at a defined point and of a defined size are identified. In simulated measurements, the input geometry of the simulation or the simulated defects can be used as a reference or ground truth. Furthermore, this can be determined on the basis of properties of the volume data, for example, noise level and resolution. The higher the noise level and the worse the resolution, the more improbable it becomes that small defects are correctly identified. In a further example, the evaluation method, for example an artificial neural network, can be trained to make a corresponding prediction of the reliability of the analysis results itself.

Furthermore, the measuring task can include, for example, at least one determination of a boundary surface of the object.

Furthermore, respective minimum requirements can be defined for the determination of the boundary surface of the object, which still have to be achieved using the optimized recording parameters. A minimum accuracy for the determination of the boundary surface or its position can be defined, for example. A further example can be a minimum certainty at which the boundary surface has to be determinable or identifiable.

In all above-mentioned examples, alternatively or additionally, an analysis of properties of fibers or fiber structures in the object can be carried out.

The step of optimizing the at least one recording parameter for the at least one measuring task can furthermore include, according to another example, at least one of the following substeps: changing the at least one recording parameter until boundary surfaces in the object are determined at a probability, which is within a predefined probability interval for boundary surfaces, at a predefined minimum accuracy for the boundary surfaces.

The minimum accuracy can also be defined for boundary surfaces. Since, as already explained above, it has not yet been possible to achieve a probability of 100%, in this example probability intervals can be specified, in which the probability that each boundary surface in the object has been determined at a predefined minimum accuracy has to be. The probability interval can be defined so that, for example, in an observed boundary surface area, the real boundary surface, 95% of the time, i.e., for example, in 19 of 20 measurements, is at a distance from the determined boundary surface at most by a value which corresponds to the minimum accuracy. This is then considered to be reliable. The minimum accuracy can be defined locally, possibly varying.

To assess how accurately the local accuracies of the boundary surfaces can be determined with given, possibly optimized recording parameters, for example, real and/or simulated test measurements can be carried out. The probability can be determined therefrom with the aid of Monte Carlo methods that local accuracy can be identified at a defined point and a defined size. In simulated measurements, the input geometry of the simulation or the simulated local accuracy can be used as a reference or ground truth. Furthermore, this can be determined on the basis of properties of the volume data, for example, noise level and resolution. The higher the noise level, the lower the local accuracy of the boundary surface is. At a poor resolution, the accuracy in boundary surface areas is negatively affected by small structures. In a further example, the evaluation method, for example an artificial neural network, can be trained to make a corresponding prediction of the reliability of the analysis results itself.

Geometric parameters can be, for example, the defect volume or the diameter of a defect, possibly equivalent to a sphere of equal volume.

The minimum accuracy can also be defined for defects of a certain size, for example as a volume of defects from the range 200 $\mu m^3$ to 300 $\mu m^3$, which is to be accurately determinable to 10%. Since as explained above it has not yet been possible to achieve a probability of 100%, corresponding probability intervals can be defined, for example, that in 95% or 19 of 20 cases the measurement deviation of the defect volume is at most 10%. The minimum accuracy can be defined locally (also varying).

Real and/or simulated test measurements can also be carried out here, for example, to assess how accurately the geometrical parameters can be determined with given, possibly optimized recording parameters. The local accuracy of the determination of the geometric parameters can be determined therefrom with the aid of Monte Carlo methods. In simulated measurements, the input geometry of the simulation or the simulated defects can be used as a reference or ground truth. Furthermore, the local accuracy can be determined on the basis of properties of the volume data, for example, noise level and resolution. The higher the noise level, the lower the local accuracy of the determination of the geometric parameters typically is. Smaller defects are in particular only inaccurately detectable at a poor resolution. In a further example, the evaluation method, for example, an artificial neural network, can be trained to make a corresponding prediction of the reliability of the analysis results itself.

In all above-mentioned examples, alternatively or additionally to artificial neural networks, other methods of artificial intelligence or machine learning can be used, e.g., deep learning, support vector machines, Bayesian classifier, closest neighbor classification, random forest, support vector machine, etc.

Furthermore, in a further example, after the step of determining the measurement data for the object, the method can furthermore include the following step: optimizing the evaluation method using measurement data, which were determined by means of a measurement using the at least one optimized recording parameter, as training data.

This optimization of the evaluation method is not to be confused with the optimization of the recording parameters. In this way, the evaluation method is trained to evaluate measurement data, which were recorded using the optimized recording parameters and which therefore can have their own or very special characteristics, as well as possible. The method learns, for example, how defects are depicted in measurements of these recording parameters. This simplifies it for the method to distinguish whether an abnormality in the data is an image error, which can be caused by the low quality of the measurement data, or a real geometry or property of the component, for example a defect. This enables the analysis to be carried out successfully in spite of data qualities which are low or strongly differ locally.

The optimization of the evaluation method is typically carried out with the aid of trainable methods, which require training data including ground truth. The starting point of this optimization can be an above-explained evaluation method. Alternatively, another method can be used, for example, the above-mentioned methods of artificial intelligence or machine learning. The result of the optimization is an optimized evaluation method.

These training data can be generated, for example, by real measurements or by simulations. With real measurements, the ground truth can be determined by a reference method, for example, optically acquired micro-sections or a computer tomography measurement of very high quality. With simulated measurements, the input geometry of the simulation can be used here.

In order that the evaluation method is not excessively oriented on a specific measuring task, for example, measurements of the object using deviating or nonoptimized recording parameters can be taken into consideration in the training data.

The evaluation method to be optimized can be that mentioned herein.

The evaluation is preferably optimized, which was also already used as the foundation or as a measure for the optimization of the recording parameters.

The optimization of the evaluation method means that the evaluation method is changed so that the measuring tasks are fulfilled as well as possible on the training data.

Fulfilled as well as possible can mean, for example, that as much as possible all defects are detected without causing excessively many errors of the first and second type, or that the boundary surface can be determined with the highest possible accuracy.

To avoid so-called overfitting on the training data, methods for regularization, for example data augmentation or dropout, can be applied.

To enable the most expedient training possible, in the case of defect detection, defect geometries or shapes, defect sizes, and defect distributions can be used in the training data, which can later additionally occur in the objects to be analyzed. The knowledge in this regard can be derived from a database, e.g., in dependence on the manufacturing process such as die casting, from simulations of the manufacturing process, or from existing measurements.

Furthermore, the properties of the defects and other geometric properties of the objects can be varied as much as possible in the training data to avoid overfitting of the evaluation.

Furthermore, the optimization of recording parameters and evaluation methods can also be carried out simultaneously.

The method can furthermore include the following step, for example: optimizing the evaluation method using simulated measurement data, which were determined by means of a simulation using the at least one optimized recording parameter, as training data.

In this example, the same simulation methods or simulation methods which have already been carried out can be used, which were also used in the step of optimizing the at least one recording parameter or the at least one optimized recording parameter for the at least one measuring task to optimize the determination of measurement data.

For this purpose, a radiograph of a geometry having defined recording parameters is simulated. Virtual radiographic images are usually the result, which can accordingly be evaluated using the methods also used in the real measurements, for example, reconstruction and evaluation methods. Such a radiographic simulation can be based, for example, on ray tracing or on an image-based forward projection.

According to a further example, the method can furthermore include the following step: determining a probability value by means of the training data, which indicates whether the optimized evaluation method identifies a defect of a defined size.

The determination of the probability value can be determined for the given recording parameters. Furthermore, a probability of detection diagram (POD diagram) can be used for this purpose. This shows, as a function of the size of a defect, for example, in the number of the voxels or in the defect volume, the probability of the detection of a defect. This probability is usually 0 for extremely small defects and is usually 100% for large defects. How the POD diagram extends in between can be used for an estimation as to whether the measurement system or the selected recording parameters, or the capabilities of the measurement including evaluation, are suitable for the measuring task. The probability or the POD diagram can also be determined locally for different ranges of the measurement. A POD diagram can be defined for various measurement methods which can be used for a detection of defects in the object. Such a POD diagram can be used as the variable to be optimized in the optimization of the recording parameters and/or the evaluation method.

Furthermore, it can be provided in one example that the method furthermore includes the following step: optimizing the at least one recording parameter or the at least one optimized recording parameter based on the optimized evaluation method, wherein at least one further optimized recording parameter results.

Before the step of optimizing the at least one recording parameter based on the optimized evaluation method, a predefined abort condition can be checked. The step of optimizing the at least one recording parameter based on the optimized evaluation method is only carried out when the predefined abort condition is not met. When the step of optimizing the at least one recording parameter based on the optimized evaluation method is carried out, the evaluation method optimized by means of the optimized recording parameters is accordingly used to determine further optimized recording parameters. The further optimized recording parameters are generally better here than the previously optimized recording parameters. The foundation for the optimization has changed due to the optimized evaluation method. Thus, for example, the defects to be identified can now be detected better by the optimized evaluation method, which enables further optimization of the recording parameters, for example using even fewer projections.

According to another example, after the step of optimizing the at least one recording parameter based on the optimized evaluation method, the method can furthermore include the following step: optimizing the evaluation method or the optimized evaluation method using measurement data, which were determined by means of the at least one further optimized recording parameter, to determine a further optimized evaluation method.

In this case, the optimized evaluation method can now be further optimized by means of the further optimized recording parameters. A better evaluation method than the already optimized evaluation method is thus obtained. This optimization can originate from the original evaluation method or the optimized evaluation method or a completely different evaluation method. I.e., for example, existing evaluation methods can be further improved using the further optimized recording parameters. Alternatively, a completely new evaluation method can be improved using the further optimized recording parameters in order to avoid the further optimization remaining too close to the al-ready optimized evaluation method, which could represent a local optimum on a curve of optimized evaluation methods.

Furthermore, after the step of optimizing the evaluation method or the optimized evaluation method using the at least one optimized recording parameter to determine a further optimized evaluation method, the method can furthermore include, for example, the following step: checking whether a predefined abort condition is met; if the predefined abort condition is not met: repeating the steps of optimizing the at least one recording parameter based on the optimized evaluation method and optimizing the evaluation method or the optimized evaluation method using measurement data, which were ascertained by means of the at least one optimized recording parameter, to determine a further optimized evaluation method until a predefined abort condition is met.

The steps for optimizing the evaluation method by means of the optimized recording parameters can be carried out iteratively. Further optimized recording parameters and further optimized evaluation methods are then determined alternately. The repetition is carried out until an abort criterion has been reached, for example, a maximum computing time for the duration of the optimization or a convergence of the recording parameters or evaluation algorithms to be optimized.

In a further aspect, the invention relates to a computer program product having instructions executable on a computer, which, when executed on a computer, prompt the computer to carry out the method according to the preceding description.

Advantages and effects and refinements of the computer program product result from the advantages and effects and refinements of the above-described method. Reference is therefore made in this regard to the preceding description. A computer program product can be understood, for example, as a data carrier on which a computer program element is stored, which has instructions executable for a computer. Alternatively or additionally, a computer program product can also be understood, for example, as a permanent or volatile data memory, such as a flash memory or working memory, which has the computer program element. Further types of data memories which have the computer program element are not thus excluded, however.

Further features, details, and advantages of the invention result from the wording of the following description of exemplary embodiments on the basis of the drawings. In the figure.

Figure 1:
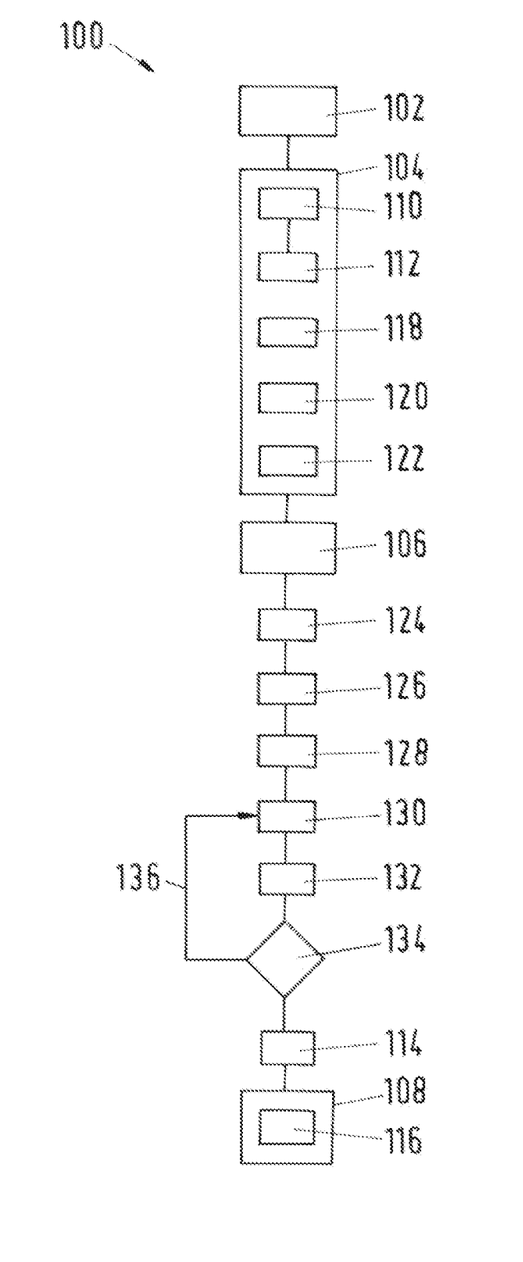
FIG. 1 shows a flow chart of an example of the computer-implemented method.

The computer-implemented method for optimizing a determining of measurement data of an object is designated hereinafter by the reference sign 100, as shown in FIG. 1.

Measurement data, the determination of which is to be optimized, are determined by means of a measurement of the object, for example, by means of a device for measuring the object. The device for measuring the object uses at least one recording parameter, which can include a measurement geometry that describes a spatial relationship between the device for measuring the object and the object and/or a setting option of the device for measuring the object. The measurement data determined in this way are evaluated on geometric properties of the object.

The method 100 is used for optimizing the determination of the measurement data of the object. For this purpose, in a first step 102, at least one measuring task is determined for the object. The measuring task describes which analyses are to be carried out on the measurement data and which areas of the object are to be analyzed. The areas of the object have geometrical properties of the object at the position of the areas.

In a further step 104, the at least one recording parameter is optimized. The optimization takes place for the at least one measuring task which was determined in step 102. I.e., that the recording parameters determined in step 104 are optimized for the measuring task determined in step 102. When measurement data are determined by means of the at least one recording parameter from step 104, these measurement data match optimally with the measuring task in order to be able to make a statement about the object with respect to the analyses to be carried out with high efficiency.

Step 104 can include optional substeps 110 and 112. In substep 110, a set of predefined measurement geometries is provided. The measurement geometries are used to describe the relative position of the device for measuring the object and the object. When various measurement geometries are used, the object is measured at different relative positions in relation to the device for measuring the object.

A subset is selected from the set of predefined measurement geometries in substep 112 based on the measuring task. The subset of the set of the predefined measurement geometries supplies optimal measurement data with respect to the measuring task when these measurement geometries are used in the determination of the measurement data by the device for measuring the object.

If the measurement is a radiographic measurement, which is carried out, for example, by means of an axial computer tomography, first the axial computer tomography can be carried out or simulated. The optimization can then be carried out on the basis of the measurement data provided as projections, in order to determine which projections have to be used at all for the measuring task. Since each projection is linked to a measurement geometry, which is a radiographic geometry in this case, the measurement geometries to be used can thus be concluded. This selection of measurement geometries can be used for further measurements. No further measurement data have to be determined or simulated during the optimization, since only one selection is made. In this way, the search space for the measurement geometries to be selected is extremely restricted, which facilitates or accelerates carrying out the optimization.

Step 104 can alternatively or additionally furthermore include optional substep 118 if the measuring task comprises at least one defect analysis for determination and analysis of possible defects in the object. The measurement is then a radiographic measurement, which also acquires the inner volume of the object. The at least one recording parameter to be optimized is changed until every defect which has a predefined minimum size has been detected in the object. The detection has to take place at a probability which is within a predefined probability interval for the defects. The probability interval can be defined, for example, so that the defects are to be detected at a probability of 70%. I.e., that the defects have to be detected in 7 of 10 analyses of equivalent measurement data.

Alternatively or additionally, step 104 can furthermore include optional substep 120 if the measuring task comprises at least one defect analysis for the determination and analysis of possible defects in the object. The measurement is then a radiographic measurement which also acquires the inner volume of the object. In this substep, the at least one recording parameter is changed until geometric parameters of the defects in the object have been determined at a predefined minimum accuracy for defects. The determination of the predefined minimum accuracy has to take place at a probability which is within a predefined probability interval for the geometric parameters. It can thus be required for the geometric parameters, for example, that the geometric parameters have been detected at a probability of 90% at the minimum accuracy. In this case, 9 of 10 analyses of equivalent measurement data have to detect the geometric parameters at this minimum accuracy.

Furthermore, step 104 can alternatively or additionally include optional substep 122, in which the at least one recording parameter is changed until boundary surfaces in the object have been determined at a predefined minimum accuracy for boundary surfaces. The determination of the boundary surfaces at a predefined minimum accuracy has to be carried out at a probability which is within a predefined probability interval for boundary surfaces. The probability interval for boundary surfaces can be defined, for example, so that the boundary surfaces are detected at a probability of 85% at the minimum accuracy. I.e., for example, in 17 of 20 analyses of equivalent measurement data, the position of the boundary surface was detected at the minimum accuracy.

Furthermore, the method 100 includes step 106, in which measurement data for the object are determined. The measurement data are determined using the at least one optimized recording parameter. This can mean that in comparison to the non-optimized recording parameters, only certain measurement geometries are used in order to determine the measurement data.

Furthermore, the method 100 can include an optional step 114, in which a digital three-dimensional object representation is determined from the measurement data determined in step 106. This can take place, for example, if the measurement data have been determined by means of a radiographic measurement. Volume data can then be determined by means of tomographic calculations from the measurement data provided as radiographic images, which are generally projections of the object.

In a further step 108, the at least one measuring task for the object can be carried out on the basis of the determined measurement data from step 106. If the method 100 includes optional step 114, step 108 includes optional substep 116. In substep 116, the digital object representation is analyzed on the basis of the measuring task.

Using the at least one optimized recording parameter, the number of the measurements can be reduced enough that the measuring task can thus just be carried out with sufficient informative power. In this way, the time for the otherwise additionally arising measurements, using which the informative power of the measuring task carried out would be increased only insignificantly or not at all, can be saved and the measuring task including the determination of the measurement data can be carried out in a more time-efficient manner.

After step 106 and, in this example, before step 108, the method 100 can furthermore include optional step 124. In this optional step, the evaluation method, which is defined in the measuring task, is optimized using measurement data which were determined by means of the use of the at least one optimized recording parameter. The at least one optimized recording parameter is used in this optional step to determine measurement data. These measurement data are of better quality due to the optimization of the at least one recording parameter than measurement data which were determined without an optimization of the at least one recording parameter.

These measurement data of better quality are then used to optimize the evaluation method.

In a further optional step 126, the method 100 can optimize the evaluation method using simulated measurement data. The simulation of the measurement data takes place by means of the at least one optimized recording parameter. More optimum measurement data are also determined in this case than without optimization of the recording parameter. These measurement data thus also have a higher quality than the measurement data determined without optimization of the recording parameter. They can therefore be used to optimize the evaluation method.

Both in step 124 and in step 126, the measurement data determined using the at least one optimized recording parameter are used as training data for the optimization of the evaluation method.

In a further optional step 128 of the method 100, a probability value is determined by means of the training data. This probability value indicates whether the optimized evaluation method identifies a defect of a defined size. I.e., it is checked whether the optimized evaluation method meets a minimum requirement for the determination of defects in the object. The measurement which is used for the determination of the measurement data is preferably a radiographic measurement.

The optimized evaluation method can be used in a further optional step 130 of the method 100 to optimize the at least one recording parameter. I.e., the evaluation method optimized using the original at least one recording parameter is now in turn used to optimize the at least one recording parameter. At least one arbitrary recording parameter can be optimized. This can be the originally used recording parameter. Alternatively, this can be the already optimized recording parameter or a recording parameter previously unused in this method 100. Since the determined measurement data can be further improved due to the optimized evaluation method, the recording parameters can also be further optimized, in order to possibly reduce the number of the required measurement geometries for carrying out the measuring task.

Simulated or real measurement data can be used for the optimization of the recording parameters, which are already available for the optimization of the evaluation algorithm and vice versa, for example. The computing time can thus be further reduced.

In a further optional step 132, the evaluation method or the optimized evaluation method can now again be optimized. Measurement data are used which were determined by means of the further optimized recording parameter. This results in a further improvement of the at least one recording parameter for the device for measuring the object with respect to the measuring task to be carried out.

In order to be able to carry out a successful evaluation using the evaluation method if only a few radiographic images are provided, prior knowledge about the nominal geometry of the object can be used in the reconstruction, i.e., in the determination of the three-dimensional digital object representation. A reconstruction method, which is iterative, for example, can converge faster or better to a correct result in this example. Furthermore, a reference can be generated from a simulation of a measurement of the nominal geometry or from an averaging of measurements already carried out of objects of identical nominal geometry. In order to carry out or facilitate an analysis, for example, a defect analysis, the measurement data, for example, two-dimensional and/or three-dimensional measurement data of the measurement object to be examined can be compared to the reference.

Furthermore, the evaluation method can take into consideration which point in the measured object is presently being evaluated. In this way, knowledge about local properties of the object with respect to the measurement geometry can be taken into consideration. This knowledge can describe in an area that higher noise is to be expected there, so that a conservative procedure is to be used in the identification of defects in order to avoid incorrect identifications.

In a further optional step 134, it is checked whether a predefined abort condition is met with respect to the optimization of the evaluation methods. An abort condition can require, for example, that measurement data can be determined in a sufficiently short time using the optimized evaluation methods and the optimized recording parameters in order to achieve a time saving without sacrificing the quality of the evaluation. An abort condition can also be defined differently, however.

When the predefined abort condition is met, it is possible to continue with step 108. When the predefined abort condition is not met, in a further optional step 136 of the method 100, steps 130 and 132 can be repeated until the predefined abort condition is met. In this way, an optimization of the evaluation methods and the recording parameters can be carried out iteratively.

The sequence of the steps described in this example can be changed arbitrarily, if reasonably executable.

The computer-implemented method 100 can be executed by means of a computer program product on a computer. The computer program product has instructions executable on a computer. When these instructions are executed on a computer, they prompt the computer to carry out the method.

The invention is not restricted to one of the above-described embodiments, but rather is modifiable in many ways. All features and advantages arising from the description, and the drawing, including design details, spatial arrangements, and method steps, can be essential to the invention both as such and also in greatly varying combinations.

The invention claimed is:

1. A computer-implemented method for optimizing a determining of measurement data of an object, wherein the measurement data are evaluated for geometric properties of the object to be analyzed, wherein the measurement data are determined by means of a measurement of the object using at least one recording parameter, wherein the at least one recording parameter comprises at least one measurement geometry and/or at least one setting option for the measurement, wherein the method includes the following steps:
- determining at least one measuring task for the object, wherein the measuring task includes an evaluation method and defines the geometric properties of the object to be analyzed;
- optimizing the at least one recording parameter for the at least one measuring task to optimize the determination of measurement data;
- determining the measurement data for the object by means of a measurement using the at least one optimized recording parameter;
- carrying out the at least one measuring task for the object on the basis of the determined measurement data;
- optimizing the evaluation method using simulated measurement data, which were determined by means of a simulation using the at least one optimized recording parameter, as training data; and
- determining a probability value by means of the training data, wherein the probability value indicates whether the optimized evaluation method identifies a defect of a defined size.

2. The computer-implemented method as claimed in claim 1, wherein the step of optimizing the at least one recording parameter for the at least one measuring task furthermore includes the following substeps:
- providing a set of predefined measurement geometries; and
- selecting a subset of the set of predefined measurement geometries based on the measuring task.

3. The computer-implemented method as claimed in claim 1, wherein the method, after the step of determining the measurement data for the object, furthermore includes the following step:
- determining a digital three-dimensional object representation from the measurement data;
wherein the step of carrying out the at least one measuring task includes the following substep:
- analyzing the digital object representation on the basis of the measuring task.

4. The computer-implemented method as claimed in claim 1, wherein the step of optimizing the at least one recording parameter is carried out by means of at least one simulated radiographic measurement of the object.

5. The computer-implemented method as claimed in claim 1, wherein the measuring task comprises at least one defect analysis to determine and analyze possible defects in the object, wherein the measurement is a radiographic measurement.

6. The computer-implemented method as claimed in claim 5, wherein the measurement is a radiographic measurement, and wherein the step of optimizing the at least one recording parameter for the at least one measuring task furthermore includes at least one of the following substeps:
- changing the at least one recording parameter until every defect in the object which has a predefined minimum size is detected at a probability which is within a predefined probability interval for defects; or
- changing the at least one recording parameter until geometric parameters of the defects in the objects are determined at a probability, which is within a predefined probability interval for geometric parameters, at a predefined minimum accuracy for defects.

7. The computer-implemented method as claimed in claim 1, wherein the measuring task includes at least one determination of a boundary surface of the object.

8. The computer-implemented method as claimed in claim 7, wherein the step of optimizing the at least one recording parameter for the at least one measuring task furthermore includes the following substep:
- changing the at least one recording parameter until boundary surfaces in the object are determined at a probability which is within a predefined probability interval for boundary surfaces, at a predefined minimum accuracy for the boundary surfaces.

9. The computer-implemented method as claimed in claim 1, wherein the method, after the step of determining the measurement data for the object, furthermore includes the following step:
- optimizing the evaluation method using measurement data, which were determined by means of a measurement using the at least one optimized recording parameter, as training data.

10. The computer-implemented method as claimed in claim 1, wherein the method furthermore has the following step:
- optimizing the at least one recording parameter or the at least one optimized recording parameter based on the optimized evaluation method, wherein a further optimized recording parameter results.

11. The computer-implemented method as claimed in claim 10, wherein the method, after the step of optimizing the at least one recording parameter based on the optimized evaluation method, furthermore includes the following step:
- optimizing the evaluation method or the optimized evaluation method using measurement data, which were determined by means of the at least one further optimized recording parameter, to determine a further optimized evaluation method.

12. The computer-implemented method as claimed in claim 11, wherein the method, after the step of optimizing the evaluation method or the optimized evaluation method using the at least one optimized recording parameter to determine a further optimized evaluation method, furthermore includes the following steps:
- checking whether a predefined abort condition is met; and
if the predefined abort condition is not met:
- repeating the steps of optimizing the at least one recording parameter based on the optimized evaluation method and optimizing the evaluation method or the optimized evaluation method using measurement data, which were determined by means of the at least one optimized recording parameter, to determine a further optimized evaluation method until a predefined abort condition is met.

13. A non-transitory computer program product having instructions executable on a computer which, when executed on a computer, prompt the computer to carry out the computer-implemented method as claimed in claim 1.

* * * * *

UNITED STATES PATENT AND TRADEMARK OFFICE
CERTIFICATE OF CORRECTION

| | | |
|---|---|---|
| PATENT NO. | : 12,437,384 B2 | Page 1 of 1 |
| APPLICATION NO. | : 17/924333 | |
| DATED | : October 7, 2025 | |
| INVENTOR(S) | : Flessner et al. | |

It is certified that error appears in the above-identified patent and that said Letters Patent is hereby corrected as shown below:

In the Specification

Column 10, Line 27 replace "a1-ready" with -already-.

Signed and Sealed this
Eighteenth Day of November, 2025

John A. Squires
*Director of the United States Patent and Trademark Office*